United States Patent [19]

Horsley

[11] 4,399,922
[45] Aug. 23, 1983

[54] OUTLET BOX MOUNTING

[76] Inventor: Larry Horsley, 6320 Ravenwood Dr., Lithia Springs, Ga. 30057

[21] Appl. No.: 302,045

[22] Filed: Sep. 14, 1981

[51] Int. Cl.³ .............................................. H02G 3/08
[52] U.S. Cl. ..................................... 220/3.6; 174/58; 220/3.3; 220/3.7; 220/3.9; 248/DIG. 6
[58] Field of Search ............................... 220/3.2–3.94; 248/27.1, DIG. 6, DIG. 9; 33/174 G, DIG. 10; 174/52 R, 53, 57, 58

[56] References Cited

U.S. PATENT DOCUMENTS

| | | | |
|---|---|---|---|
| 1,705,768 | 3/1929 | Johnson et al. | 220/3.4 |
| 1,774,934 | 9/1930 | Mangin | 220/3.9 X |
| 1,920,811 | 8/1933 | Schwabacher | 220/3.2 X |
| 1,961,728 | 6/1934 | Arnest et al. | 220/3.7 X |
| 2,423,757 | 7/1947 | Dedge | 220/3.7 X |
| 4,057,164 | 11/1977 | Maier | 220/3.6 |
| 4,135,337 | 1/1979 | Medlin | 220/3.3 X |

Primary Examiner—William T. Dixson, Jr.
Assistant Examiner—Gary E. Elkins
Attorney, Agent, or Firm—Newton, Hopkins & Ormsby

[57] ABSTRACT

An outlet box mounting bracket has oversize openings to accept the heads of outlet box screws therethrough without necessitating removal of the screws. A dry wall ring is slotted to facilitate engagement of the ring with the shanks of the outlet box screws after the screws have been passed through the mounting bracket oversize openings. A variable length right angle extension on the mounting bracket engages the dry wall at the far side of the wall stud to which the mounting bracket is attached and stabilizes the outlet box, thereby eliminating the necessity for further anchoring screws with a consequent saving of installation labor and time. The mounting bracket is attached directly to a stud in the wall by one pair of screws.

2 Claims, 9 Drawing Figures

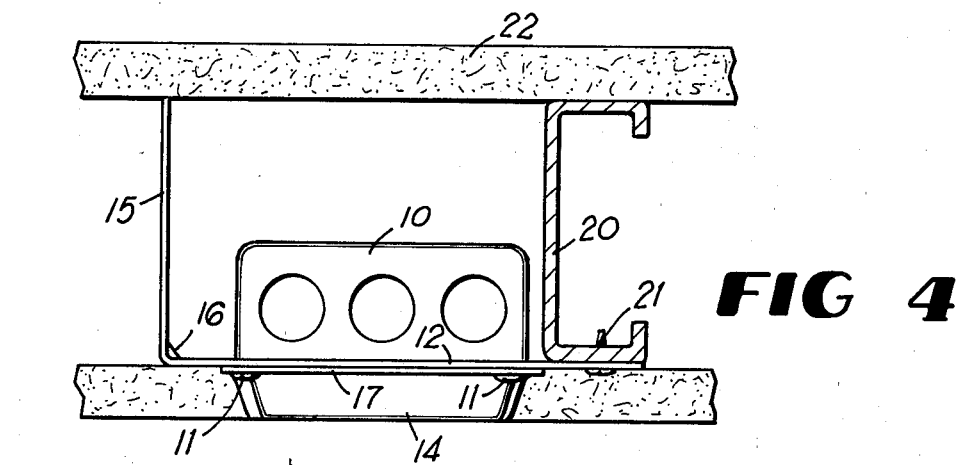
FIG 4
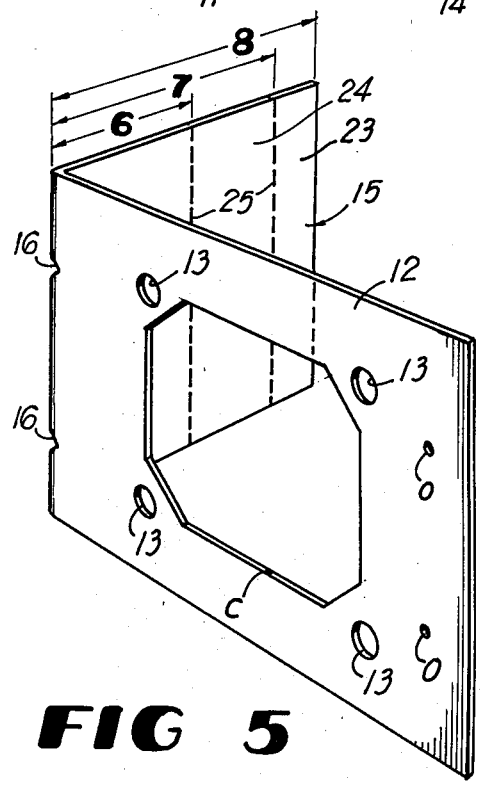
FIG 5
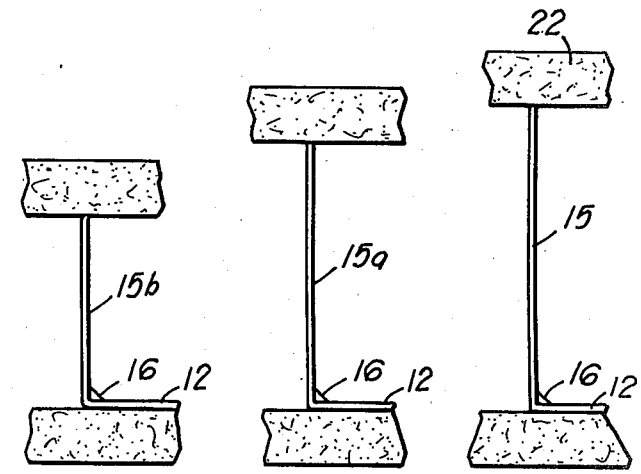
FIG 6  FIG 7  FIG 8
| CONNECT OUTLET BOX WITH BRACKET BY PLACING PARTIALLY BACKED OUT BOX SCREWS IN OVERSIZE BRACKET HOLES | → | SLIDABLY ENGAGE DRY WALL RING SLOT WITH SCREW |
| ROTATE DRY WALL RING TO LOCKED POSITION | TIGHTEN SCREWS TO BRING COMPONENTS TO ASSEMBLED POSITION | MOUNT BRACKET ON STUD |
FIG 9

OUTLET BOX MOUNTING

BACKGROUND OF THE INVENTION

The objective of the invention is to improve on a commonly used electrical outlet box mounting of the type shown in U.S. Pat. No. 4,135,337. While the mounting disclosed in this patent is highly satisfactory once assembled or installed on a supporting wall stud, it requires an unsatisfactory amount of time and labor to install. The present invention seeks to substantially reduce this time and labor in the interest of economy, without sacrifice of any function in the installed device.

In the prior art exemplified by the referenced patent, it is first necessary to remove the outlet box mounting screws in order to attach the box to a provided mounting bracket which in turn is attached to a metal wall stud. A dry wall ring must also be connected to the far side of the mounting bracket by means of the removed outlet box screws. Following the assembly of the outlet box mounting bracket and dry wall ring, this unit is attached to the wall stud with two screws. Following the hanging of dry wall on the stud, the electrician must make another trip to each box location and install two more screws in the mounting bracket on the opposite side of the stud in order to stabilize the box against the dry wall so that it will not move when electrical devices are being installed in the box. These prior art installation procedures can be quite costly in buildings where many outlet boxes are involved.

The present invention simplifies the installation procedure and saves time and therefore money in two ways. By providing the oversize screw head clearance openings in the mounting bracket it becomes unnecessary to remove and then replace the box mounting screws in order to assemble the box with the bracket and the dry wall ring at the far side of the bracket. By providing the integral adjustable length right angle extension on the mounting bracket, it is no longer necessary for the electrician to return to the outlet box after dry wall hanging to install the two additional anchor screws. The extension fully stabilizes and anchors the box in cooperation with its two mounting screws and the box will not move while electrical installations are taking place. The engagement of the extension with the far side dry wall section resists movement of the box.

BRIEF DESCRIPTION OF THE DRAWINGS

FIG. 4 is a horizontal section taken on line 4—4 of FIG. 3.

FIG. 5 is a perspective view showing a modification.

FIGS. 6, 7 and 8 are fragmentary views similar to FIG. 4 showing the mounting bracket of FIG. 5 installed in walls of different thicknesses.

FIG. 9 is a flow chart showing the steps involved in the installation of the outlet box.

DETAILED DESCRIPTION

Figure 1:
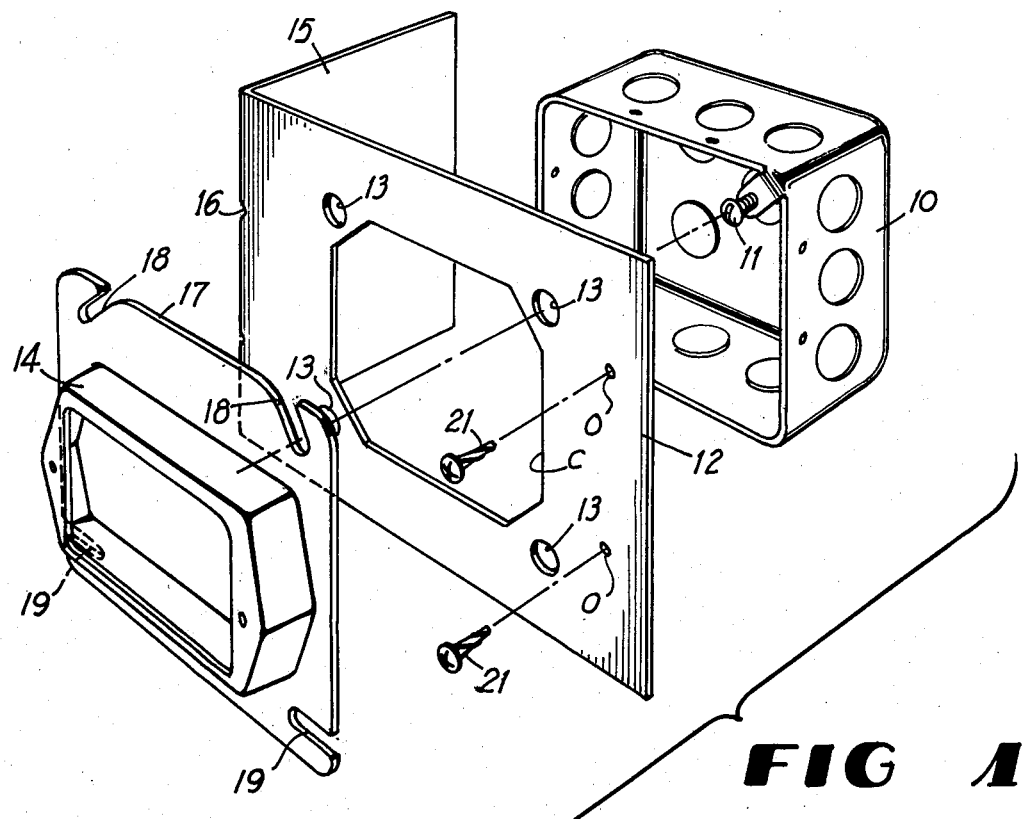
FIG. 1 is an exploded perspective view of the invention.

Referring to the drawings in detail wherein like numerals designate like parts, a conventional outlet box 10 is equipped at diagonally opposite corners with two mounting screws 11. A mounting bracket 12 for the outlet box in the form of a flat rectangular plate is provided with four openings 13 in a rectangular array to enable installation of the box in any required position on the job site. The openings 13 are sufficiently large to provide clearance for the passage of the heads of the two screws 11 therethrough during the assembly process so as to eliminate necessity for first removing the screws 11 and then re-installing them. It is only necessary that the screws 11 be backed out of their corner mountings in the box 10 about one-half of their lengths to enable assembling the box with the mounting bracket 12 and with a dry wall 14 customarily provided at the far side of the mounting bracket. The bracket 12 is provided with a central cut out or opening C which is substantially dimensionally the same as the interior of the outlet box 10. The mounting bracket 12 is further provided adjacent one end thereof with small openings O that are designed to receive screws 21 for attaching the bracket 12 to a wall stud 20.

An important feature of the invention is the provision on the mounting bracket 12 at one side thereof of an integral stiff right angular extension plate 15 preferably reinforced by corner gussets 16 to resist bending. The purpose of this extension plate will be described.

The dry wall ring 14 carries a flat base plate 17 having angled slots 18 at two of its corners and parallel slots 19 at its other corners.

Figure 2:
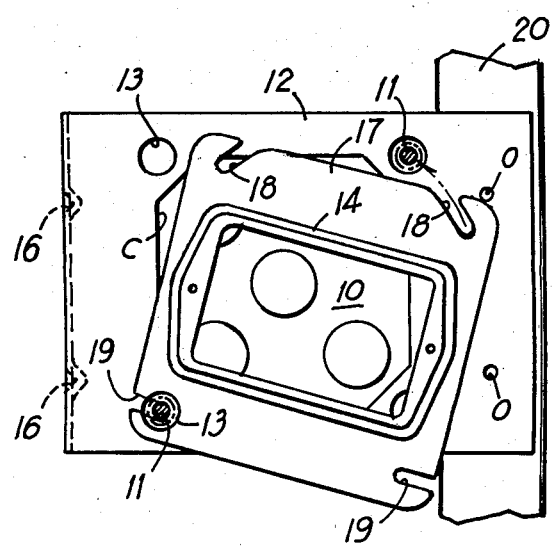
FIG. 2 is a front elevation depicting the installation of a dry wall ring.
Figure 3:
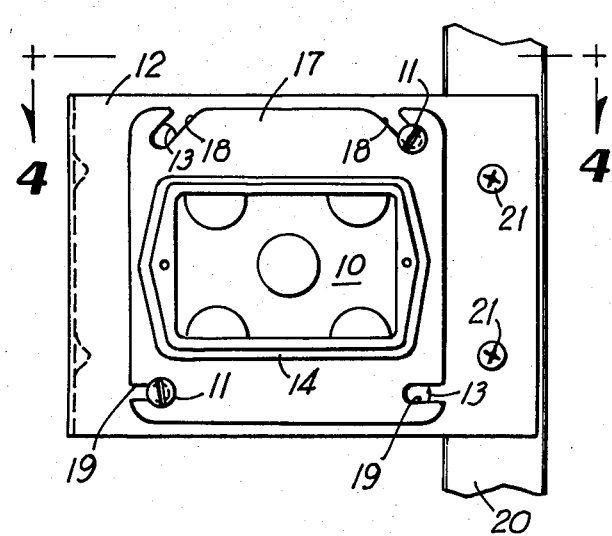
FIG. 3 is a similar view showing the assembly attached to a wall stud.

With reference to FIGS. 2 and 3, the installer of the outlet box merely backs out the two screws 11 about half way and passes their heads through two of the openings 13 of mounting bracket 12 so as to hang the box on the bracket. One slot 19 of the dry wall ring is engaged with the shank of one screw 11 and the dry wall ring is rotated as shown by the arrow in FIG. 2 to engage one of the angled slots 18 with the shank of the diagonally opposite screw 11. Following this, the two screws 11 are tightened and the three components 10, 12 and 14 are firmly assembled.

Following this assembly procedure, the edge portion of mounting bracket 12 away from the extension 15 is attached to an adjacent wall stud 20 by the utilization of two screws 21, and this operation essentially completes the mounting procedure for the box. It is unnecessary for the installer to return to the outlet box as in the prior art to install two more anchoring screws after the hanging of the dry wall. The reason for this is that the extension 15 bears against the dry wall 22 at the side of the wall away from the ring 14, FIG. 4, and this contact stabilizes the box assembly and resists its movement in concert with the two screws 21 when electrical devices are later installed.

It can be seen that the invention saves the installers time in two ways. First, they do not have to remove and re-install the two screws 11 and, second, they do not have to make a second trip to the box after the dry wall is hung to place further anchoring screws in the assembly. FIG. 9 depicts the simple sequence of steps carried out by the installers.

FIGS. 5 through 8 show a modification of the invention in which the extension 15 of bracket 12 has breakaway strips 23 and 24 defined by parallel weakening lines 25 on the extension 15. This enables the mounting bracket to be utilized conveniently with walls of differing thicknesses as shown in FIGS. 6, 7 and 8. When a wall contains a four inch interior space, FIG. 8, the entire extension 15 is utilized. When the wall has a three and one-half interior space, FIG. 7, the strip 23 is broken off and the remaining reduced width extension 15a is utilized. When the wall has a two and one-half inch space, FIG. 6, both strips 23 and 24 are removed to leave a further reduced width extension 15b which contacts the far side dry wall section. The advantages of the invention will be realized by those skilled in the art.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. An outlet box mounting comprising an L-shaped mounting bracket formed from a unitary section of stiff sheet material, said mounting bracket including a flat plate body portion having a relatively large central opening of a size and shape to register substantially with the interior chamber of an outlet box, said plate body portion having at least a pair of screw head clearance openings formed therethrough and said clearance openings being disposed on a diagonal axis across the relatively large central opening, said mounting bracket further including a right angular stabilizing rectangular plate extension including a straight edge spaced from and parallel to the plate body portion and adapted to engage an opposing wall surface during use, the stabilizing plate extension being disposed at one end of the plate body portion, the plate body portion of the L-shaped mounting bracket also having a pair of spaced bracket mounting openings formed therethrough near the edge of the plate body portion remote from said right angular stabilizing plate extension, whereby the mounting bracket can be attached to a wall stud by means of fasteners placed through said bracket mounting openings, an outlet box having at least a pair of diagonally spaced mounting screws threadedly connected therewith and adapted to register with and pass through said pair of screw head clearance openings of the plate body portion with the outlet box having its open side in abutment with the rear face of the plate body portion, and a dry wall ring positioned on the forward face of the plate body portion of the L-shaped mounting bracket and having at least a pair of diagonally spaced slots which open through marginal edges of the dry wall ring, and said slots being sized to receive the shanks of the diagonally spaced mounting screws and being sufficiently narrow to prevent the heads of such screws from passing through said slots, whereby the dry wall ring through said slots can be engaged with said mounting screws loosely and rotated to a proper position of use in alignment with said outlet box and then secured by the tightening of said mounting screws.

2. An outlet box mounting as defined in claim 1, and said right angular stabilizing rectangular plate extension having at least a pair of spaced parallel score lines thereon parallel to said straight edge adapted to engage an opposing wall surface and defining on said plate extension a plurality of break away strips whereby the size of the stabilizing plate extension of the L-shaped mounting bracket can be varied.

* * * * *